United States Patent
Clauson et al.

(10) Patent No.: US 10,787,933 B2
(45) Date of Patent: Sep. 29, 2020

(54) LOW-POWER BOWED ROTOR PREVENTION AND MONITORING SYSTEM

(71) Applicant: United Technologies Corporation, Farmington, CT (US)

(72) Inventors: Jesse W. Clauson, Agawam, MA (US); Frederick M. Schwarz, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 734 days.

(21) Appl. No.: 15/186,839

(22) Filed: Jun. 20, 2016

(65) Prior Publication Data
US 2017/0363012 A1    Dec. 21, 2017

(51) Int. Cl.
*F01D 25/36* (2006.01)
*F01D 1/14* (2006.01)
(Continued)

(52) U.S. Cl.
CPC ............ *F01D 25/36* (2013.01); *F01D 21/00* (2013.01); *F01D 21/06* (2013.01); *F01D 21/14* (2013.01); *F01D 25/12* (2013.01); *F01D 25/34* (2013.01); *F02C 7/275* (2013.01); *F02C 9/00* (2013.01); *F05D 2270/114* (2013.01); *F05D 2270/303* (2013.01); *F05D 2270/44* (2013.01); *F05D 2270/52* (2013.01); *Y02T 50/671* (2013.01)

(58) Field of Classification Search
CPC .......... F01D 25/34; F01D 25/36; F01D 19/02; F01D 21/00; F01D 21/04; F01D 21/12; F01D 21/06; F01D 25/12; F01D 21/14; F02C 9/00; F05D 2260/85; F05D 2270/303; F05D 2270/114; F05D 2270/44; F05D 2270/52; F05D 2270/54; Y02T 50/671
See application file for complete search history.

(56) References Cited

U.S. PATENT DOCUMENTS 1,951,875 A    3/1934 Laabs
2,617,253 A   11/1952 Fusner et al.
(Continued)

FOREIGN PATENT DOCUMENTS

EP    2305986    4/2011
EP    3211184    8/2017
(Continued)

OTHER PUBLICATIONS

EP Application No. 17158502.9 Extended EP Search Report dated Jul. 20, 2017, 9 pages.
(Continued)

*Primary Examiner* — Alain Chau
(74) *Attorney, Agent, or Firm* — Cantor Colburn LLP

(57) ABSTRACT

A bowed rotor prevention system for a gas turbine engine includes a core turning motor operable to drive rotation of an engine core of the gas turbine engine. The bowed rotor prevention system also includes a full authority digital engine control (FADEC) that controls operation of the gas turbine engine in a full-power mode and controls operation of the core turning motor to drive rotation of the engine core using a reduced power draw when the FADEC is partially depowered in a low-power bowed rotor prevention mode.

20 Claims, 5 Drawing Sheets

(51) Int. Cl.
*F01D 25/12* (2006.01)
*F02C 7/275* (2006.01)
*F01D 21/00* (2006.01)
*F01D 21/06* (2006.01)
*F01D 25/34* (2006.01)
*F02C 9/00* (2006.01)
*F01D 21/14* (2006.01)

(56) References Cited

U.S. PATENT DOCUMENTS

| | | | |
|---|---|---|---|
| 2,962,597 A | 11/1960 | Evans | |
| 3,057,155 A | 10/1962 | Rizk | |
| 3,151,452 A | 10/1964 | Bunger et al. | |
| 3,764,815 A | 10/1973 | Habock et al. | |
| 3,793,905 A | 2/1974 | Black et al. | |
| 3,898,439 A * | 8/1975 | Reed | F02C 9/26 |
| | | | 700/287 |
| 3,924,141 A * | 12/1975 | Yannone | F02C 7/26 |
| | | | 290/40 R |
| 3,951,008 A * | 4/1976 | Schneider | F16H 35/18 |
| | | | 74/661 |
| 4,019,315 A * | 4/1977 | Yannone | F02C 7/26 |
| | | | 60/773 |
| 4,044,550 A | 8/1977 | Vermilye | |
| 4,069,424 A | 1/1978 | Burkett | |
| 4,144,421 A | 3/1979 | Sakai | |
| 4,380,146 A * | 4/1983 | Yannone | F02C 9/26 |
| | | | 60/39.281 |
| 4,598,551 A | 7/1986 | Dimitroff, Jr. et al. | |
| 4,608,820 A * | 9/1986 | White | F02C 9/46 |
| | | | 251/129.11 |
| 4,627,234 A | 12/1986 | Schuh | |
| 4,713,985 A | 12/1987 | Ando | |
| 4,718,229 A * | 1/1988 | Riley | F02C 7/25 |
| | | | 60/39.281 |
| 4,722,061 A * | 1/1988 | Carlisle | F01D 17/06 |
| | | | 318/564 |
| 4,733,529 A | 3/1988 | Nelson et al. | |
| 4,854,120 A | 8/1989 | Nelson et al. | |
| 4,979,362 A | 12/1990 | Vershure, Jr. | |
| 5,103,629 A | 4/1992 | Mumford et al. | |
| 5,123,239 A | 6/1992 | Rodgers | |
| 5,127,220 A | 7/1992 | Jesrai et al. | |
| 5,174,109 A | 12/1992 | Lampe | |
| 5,184,458 A | 2/1993 | Lampe et al. | |
| 5,201,798 A | 4/1993 | Hogan | |
| 5,349,814 A | 9/1994 | Ciokajlo et al. | |
| 6,098,011 A * | 8/2000 | Scott | G05B 9/03 |
| | | | 318/564 |
| 6,146,090 A * | 11/2000 | Schmidt | F01D 5/084 |
| | | | 415/116 |
| 6,168,377 B1 | 1/2001 | Wolfe et al. | |
| 6,176,074 B1 * | 1/2001 | Thompson | F01D 21/045 |
| | | | 60/39.091 |
| 6,190,127 B1 | 2/2001 | Schmidt | |
| 6,293,085 B2 | 9/2001 | Thompson | F01D 21/045 |
| | | | 60/39.281 |
| 6,318,958 B1 | 11/2001 | Giesler et al. | |
| 6,353,790 B1 * | 3/2002 | Tsuzuki | F02C 9/263 |
| | | | 60/204 |
| 6,439,504 B1 | 8/2002 | Ahrendt | |
| 6,478,534 B2 | 11/2002 | Bangert et al. | |
| 6,498,978 B2 | 12/2002 | Leamy et al. | |
| 6,517,314 B1 | 2/2003 | Burnett et al. | |
| 6,558,118 B1 | 5/2003 | Brisson et al. | |
| 6,681,579 B2 | 1/2004 | Lane et al. | |
| 6,762,512 B2 | 7/2004 | Nelson | |
| 6,943,699 B2 | 9/2005 | Ziarno | |
| 7,104,072 B2 | 9/2006 | Thompson | |
| 7,133,801 B2 | 11/2006 | Song | |
| 7,409,319 B2 | 8/2008 | Kant et al. | |
| 7,428,819 B2 | 9/2008 | Cataldi et al. | |
| 7,507,070 B2 | 3/2009 | Jones | |
| 7,543,439 B2 | 6/2009 | Butt et al. | |
| 7,587,133 B2 | 9/2009 | Franke et al. | |
| 7,742,881 B2 | 6/2010 | Muralidharan et al. | |
| 7,909,566 B1 | 3/2011 | Brostmeyer | |
| 7,972,105 B2 | 7/2011 | Dejoris et al. | |
| 8,090,456 B2 | 1/2012 | Karpman et al. | |
| 8,291,715 B2 | 10/2012 | Libera et al. | |
| 8,306,776 B2 | 11/2012 | Ihara et al. | |
| 8,770,913 B1 | 7/2014 | Negron et al. | |
| 8,776,530 B2 | 7/2014 | Shirooni et al. | |
| 8,820,046 B2 * | 9/2014 | Ross | F02C 7/26 |
| | | | 60/39.13 |
| 8,918,264 B2 * | 12/2014 | Jegu | F01D 21/003 |
| | | | 701/100 |
| 8,979,705 B2 | 3/2015 | Galivel et al. | |
| 9,086,018 B2 | 7/2015 | Winston et al. | |
| 9,121,309 B2 | 9/2015 | Geiger | |
| 9,394,084 B1 | 7/2016 | Edwards et al. | |
| 9,664,070 B1 * | 5/2017 | Clauson | F01D 25/36 |
| 9,840,997 B2 * | 12/2017 | Dooley | F02C 7/26 |
| 10,174,678 B2 * | 1/2019 | Schwarz | F02C 7/26 |
| 10,443,507 B2 * | 10/2019 | Schwarz | F01D 25/36 |
| 2003/0056492 A1 * | 3/2003 | Henson | F01D 25/26 |
| | | | 60/39.281 |
| 2003/0056494 A1 * | 3/2003 | Coleman | F01D 25/26 |
| | | | 60/239 |
| 2004/0088991 A1 * | 5/2004 | Gallant | G05B 9/03 |
| | | | 60/772 |
| 2004/0131138 A1 | 7/2004 | Correia et al. | |
| 2005/0267667 A1 * | 12/2005 | Muramatsu | F02C 9/28 |
| | | | 701/100 |
| 2005/0284214 A1 * | 12/2005 | Gustafson | F01D 25/285 |
| | | | 73/112.01 |
| 2006/0188372 A1 * | 8/2006 | Hansen | F01D 25/36 |
| | | | 416/169 R |
| 2008/0211237 A1 | 9/2008 | Berenger | |
| 2009/0071442 A1 * | 3/2009 | Emo | F02C 7/20 |
| | | | 123/446 |
| 2009/0301053 A1 | 12/2009 | Geiger | |
| 2010/0095791 A1 | 4/2010 | Galloway | |
| 2010/0132365 A1 | 6/2010 | Labala | |
| 2010/0293961 A1 | 11/2010 | Tong et al. | |
| 2011/0046863 A1 * | 2/2011 | Tezuka | F01D 21/02 |
| | | | 701/100 |
| 2011/0077783 A1 | 3/2011 | Karpman et al. | |
| 2011/0138816 A1 * | 6/2011 | Takeda | F01D 25/36 |
| | | | 60/772 |
| 2011/0146276 A1 | 6/2011 | Sathyanarayana et al. | |
| 2011/0153295 A1 | 6/2011 | Yerramalla et al. | |
| 2011/0232294 A1 | 9/2011 | Ross et al. | |
| 2011/0296843 A1 | 12/2011 | Lawson, Jr. | |
| 2012/0240591 A1 | 9/2012 | Snider et al. | |
| 2012/0266601 A1 | 10/2012 | Miller | |
| 2012/0316748 A1 * | 12/2012 | Jegu | F01D 21/003 |
| | | | 701/100 |
| 2013/0031912 A1 | 2/2013 | Finney et al. | |
| 2013/0091850 A1 | 4/2013 | Francisco | |
| 2013/0101391 A1 | 4/2013 | Szwedowicz et al. | |
| 2013/0251501 A1 | 9/2013 | Araki et al. | |
| 2013/0255220 A1 * | 10/2013 | Mathews, Jr. | F02C 9/00 |
| | | | 60/39.24 |
| 2014/0123673 A1 | 5/2014 | Mouze et al. | |
| 2014/0199157 A1 | 7/2014 | Haerms et al. | |
| 2014/0241878 A1 | 8/2014 | Herrig et al. | |
| 2014/0260306 A1 * | 9/2014 | Dooley | F02C 7/26 |
| | | | 60/778 |
| 2014/0271152 A1 | 9/2014 | Rodriguez | |
| 2014/0301820 A1 | 10/2014 | Lohse et al. | |
| 2014/0318144 A1 | 10/2014 | Lazzeri et al. | |
| 2014/0334927 A1 | 11/2014 | Hammerum | |
| 2014/0366546 A1 | 12/2014 | Bruno et al. | |
| 2014/0373518 A1 | 12/2014 | Manneville et al. | |
| 2014/0373552 A1 | 12/2014 | Zaccaria et al. | |
| 2014/0373553 A1 | 12/2014 | Zaccaria et al. | |
| 2014/0373554 A1 | 12/2014 | Pech et al. | |
| 2015/0016949 A1 | 1/2015 | Smith | |
| 2015/0115608 A1 | 4/2015 | Draper | |
| 2015/0121874 A1 | 5/2015 | Yoshida et al. | |

(56) References Cited

U.S. PATENT DOCUMENTS

| | | | |
|---|---|---|---|
| 2015/0128592 A1 | 5/2015 | Filiputti et al. | |
| 2015/0159625 A1 | 6/2015 | Hawdwicke, Jr. et al. | |
| 2016/0265445 A1* | 9/2016 | Fiedler | F01D 21/00 |
| 2016/0348588 A1* | 12/2016 | Ross | F01D 19/02 |
| 2017/0233089 A1* | 8/2017 | Zaccaria | F02C 7/27 |
| | | | 60/778 |
| 2017/0234235 A1* | 8/2017 | Pech | F02C 7/27 |
| | | | 290/31 |
| 2017/0342855 A1* | 11/2017 | Hon | F01D 19/02 |
| 2017/0342908 A1* | 11/2017 | Hon | F02C 7/26 |
| 2018/0010522 A1* | 1/2018 | Harder | F02C 7/275 |
| 2018/0355764 A1 | 12/2018 | Clauson et al. | |

FOREIGN PATENT DOCUMENTS

| | | | |
|---|---|---|---|
| FR | 2933131 | 1/2010 | |
| GB | 1374810 | 11/1974 | |
| GB | 2117842 | 10/1983 | |
| IN | 201408865 | 5/2015 | |
| JP | 2002371806 | 12/2002 | |
| JP | 2004036414 | 2/2004 | |
| WO | 9900585 | 1/1999 | |
| WO | 2013007912 | 1/2013 | |
| WO | 2014152701 | 9/2014 | |
| WO | 2015030946 | 3/2015 | |
| WO | WO-2016069303 A1 * | 5/2016 | F01D 15/10 |

OTHER PUBLICATIONS

EP Application No. 17176233.9 Extended EP Search Report dated Dec. 7, 2017, 9 pages.

* cited by examiner

LOW-POWER BOWED ROTOR PREVENTION AND MONITORING SYSTEM

BACKGROUND

This disclosure relates to gas turbine engines, and more particularly to a bowed rotor prevention system.

Gas turbine engines are used in numerous applications, one of which is for providing thrust to an aircraft. When a gas turbine engine of an aircraft has been shut off for example, after an aircraft has landed at an airport, the engine is hot and due to heat rise, the upper portions of the engine will be hotter than lower portions of the engine. When this occurs thermal expansion may cause deflection of components of the engine which may result in a "bowed rotor" condition. If a gas turbine engine is in such a "bowed rotor" condition it is undesirable to restart or start the engine.

Accordingly, it is desirable to provide a method and/or apparatus for preventing/mitigating a "bowed rotor" condition.

BRIEF DESCRIPTION

In one embodiment, a bowed rotor prevention system for a gas turbine engine is provided. The bowed rotor prevention system includes a core turning motor operable to drive rotation of an engine core of the gas turbine engine. The bowed rotor prevention system also includes a full authority digital engine control (FADEC) that controls operation of the gas turbine engine in a full-power mode and controls operation of the core turning motor to drive rotation of the engine core using a reduced power draw when the FADEC is partially depowered in a low-power bowed rotor prevention mode.

In addition to one or more of the features described above, or as an alternative to any of the foregoing embodiments, further embodiments may include a switch interposed between the FADEC and an aircraft power source, where the core turning motor is an electric motor and the FADEC is operable to control a flow of electric current between the aircraft power source and the core turning motor based on a state of the switch.

In addition to one or more of the features described above, or as an alternative to any of the foregoing embodiments, further embodiments may include where the FADEC is operable to transition from the full-power mode to the low-power bowed rotor prevention mode based on detecting an engine shutdown condition of the gas turbine engine.

In addition to one or more of the features described above, or as an alternative to any of the foregoing embodiments, further embodiments may include where the FADEC delays enabling of the core turning motor after detecting the engine shutdown condition.

In addition to one or more of the features described above, or as an alternative to any of the foregoing embodiments, further embodiments may include where the core turning motor is mechanically linked through a transmission system to the engine core.

In addition to one or more of the features described above, or as an alternative to any of the foregoing embodiments, further embodiments may include where a gear reduction through the transmission system and the core turning motor is greater than 100:1.

In addition to one or more of the features described above, or as an alternative to any of the foregoing embodiments, further embodiments may include where the engine core is a high spool of the gas turbine engine.

In addition to one or more of the features described above, or as an alternative to any of the foregoing embodiments, further embodiments may include where the FADEC depowers itself and the core turning motor based on expiration of a time limit or as a function of a measured temperature.

In addition to one or more of the features described above, or as an alternative to any of the foregoing embodiments, further embodiments may include where the FADEC is operable to monitor an operational status of the core turning motor and determine a success status of bowed rotor prevention.

In addition to one or more of the features described above, or as an alternative to any of the foregoing embodiments, further embodiments may include where the FADEC is operable to control the core turning motor to drive rotation of the engine core at a substantially constant speed for a timed duration.

In addition to one or more of the features described above, or as an alternative to any of the foregoing embodiments, further embodiments may include where the FADEC is operable to control the core turning motor to drive rotation of the engine core for a partial rotation based on a timed duration or a sensed position.

In addition to one or more of the features described above, or as an alternative to any of the foregoing embodiments, further embodiments may include where the partial rotation is a half revolution of the engine core performed periodically.

In addition to one or more of the features described above, or as an alternative to any of the foregoing embodiments, further embodiments may include where the FADEC determines a bowed rotor risk parameter based on engine thermal history and/or a temperature measurement.

In addition to one or more of the features described above, or as an alternative to any of the foregoing embodiments, further embodiments may include where the FADEC uses the bowed rotor risk parameter to determine whether to enable the core turning motor and one or more shutdown limits of the core turning motor.

In addition to one or more of the features described above, or as an alternative to any of the foregoing embodiments, further embodiments may include where the FADEC and the core turning motor consume less than 500 watts while driving rotation of the engine core in the low-power bowed rotor prevention mode.

In addition to one or more of the features described above, or as an alternative to any of the foregoing embodiments, further embodiments may include where the FADEC and the core turning motor consume about 40 watts while driving rotation of the engine core in the low-power bowed rotor prevention mode.

In addition to one or more of the features described above, or as an alternative to any of the foregoing embodiments, further embodiments may include where the FADEC is operable to perform a dry motoring process based on determining that a bowed rotor prevention process was not successfully completed.

In addition to one or more of the features described above, or as an alternative to any of the foregoing embodiments, further embodiments may include where the core turning motor is shut down based on one or more of: a detected opening of a nacelle of the gas turbine engine, a shutoff switch accessible to maintenance personnel on the nacelle or the gas turbine engine, a computer interface command on the aircraft, a detected fault condition, a time limit, a temperature limit, or a start command of the gas turbine engine.

An embodiment includes a method of bowed rotor prevention for a gas turbine engine. The method includes engaging a core turning motor with turbomachinery of the gas turbine engine and controlling the core turning motor by a FADEC to rotate the turbomachinery of the gas turbine engine using a reduced power draw when the FADEC is partially depowered in a low-power bowed rotor prevention mode, where the FADEC controls operation of the gas turbine engine in a full-power mode.

A technical effect of the apparatus, systems and methods is achieved by using a bowed rotor prevention and start sequence for a gas turbine engine as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

Figure 1:
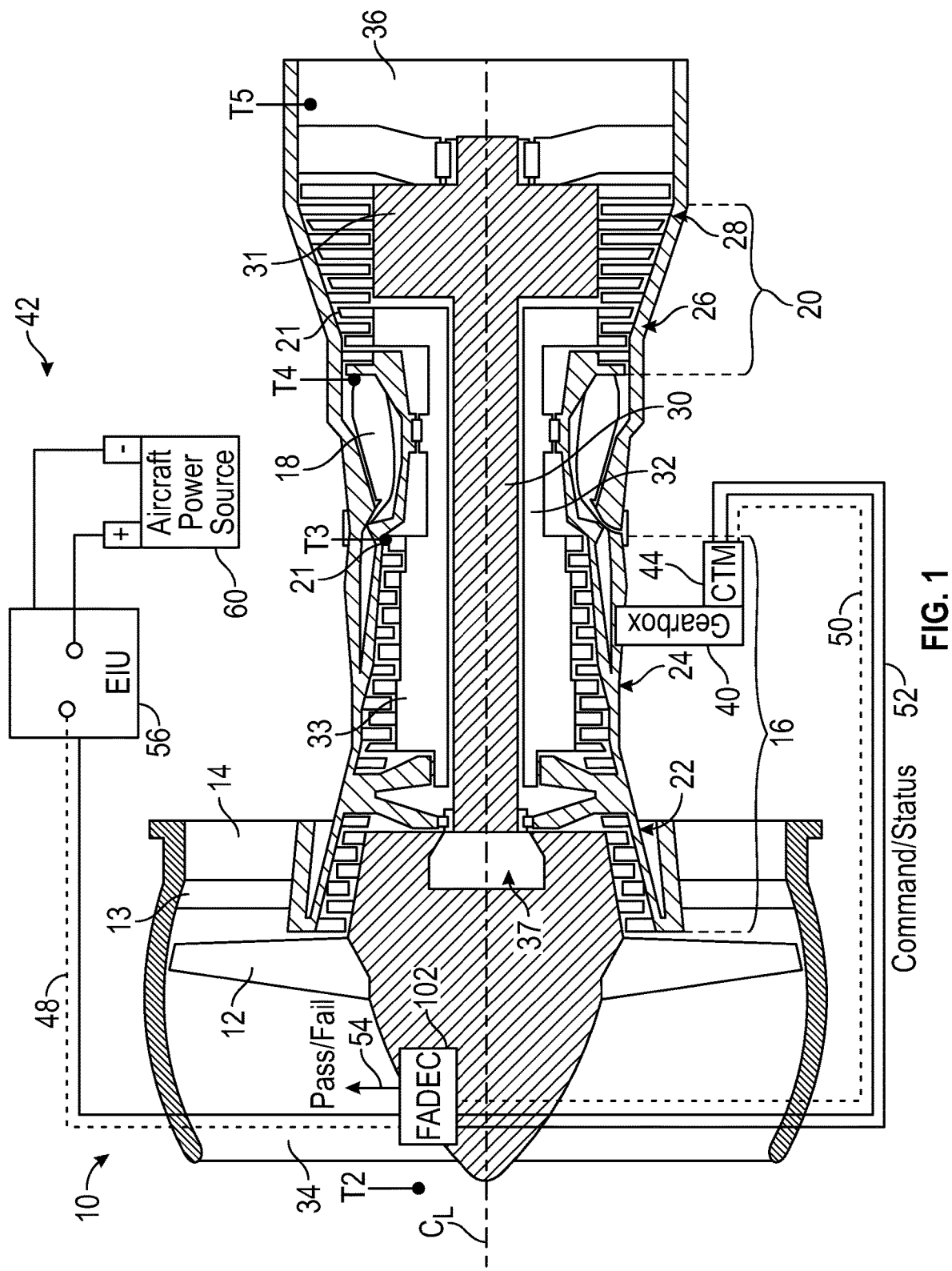
FIG. 1 is a cross-sectional view of a gas turbine engine including a bowed rotor prevention system.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present disclosure may include features and components not specifically shown in the drawings. Like reference numerals identify similar structural elements.

DETAILED DESCRIPTION

Various embodiments of the present disclosure are related to bowed rotor prevention in a gas turbine engine. Embodiments prevent a bowed rotor condition by using a core turning motor to drive rotation of the gas turbine engine under low power conditions. Embodiments use a full authority digital engine control (FADEC) in a reduced-power mode of operation to drive a core turning motor (CTM) to prevent a bowed rotor condition of the gas turbine engine based on aircraft power. The FADEC can internally isolate power requirements in a low-power bowed rotor prevention mode from a full-power (normal) mode used to control operation of the gas turbine engine such that the FADEC need not be fully operational while controlling the CTM. In the low-power bowed rotor prevention mode, a channel of the FADEC is operable to monitor the duration of engine core rotation and determine a pass/fail status, for instance, for use upon performing a subsequent engine start process. According to some embodiments a low powered implementation may be used that consumes low amounts of power. In some embodiments, the power used by the FADEC and CTM combined less than 500 watts of power by the FADEC and the CTM combined while performing core turning (i.e., bowed rotor prevention is active). In some embodiments, the FADEC and CTM combine for about 40 watts of power draw while core turning is active. Thus, whether the aircraft power source is a battery, ground power, or other source of electrical power, the power consumption is reduced as compared to using full FADEC capabilities that are typically available during normal operation of the gas turbine engine.

Aircraft power can be selectively provided through an engine interface unit (EIU) as switched power for both the FADEC and the CTM. The EIU and/or other switch locations, such as the nacelle, can depower the CTM, for instance, to perform maintenance actions.

In some embodiments, the FADEC can drive a discrete output (e.g., a 28 volt output) for bowed rotor prevention at shutdown. The FADEC may directly control power to the CTM and/or send a switching request to one or more other systems to enable the CTM. The FADEC may remain powered in full-power mode for a predetermined period of time (e.g., 10 minutes) after engine fuel has been cutoff before switching to the low-power bowed rotor prevention mode. The FADEC can drive the CTM to rotate an engine core (e.g., starting spool/N2) of the gas turbine engine at about 0.1 revolutions per minute (RPM) with a gear reduction (e.g., greater than 100:1) by applying substantially constant power (i.e., not periodic) for a period of time. Alternatively, the CTM may rotate the starting spool for a partial rotation periodically based on rotation time or reaching a sensed position (e.g., about 180 degrees of rotation per interval). The CTM can include a feedback device, depending on the type of motor selected, to monitor electric current, back electromotive force, torque, and/or other parameters. The FADEC can provide a pass/fail (e.g., successful/unsuccessful bowed rotor prevention process) status that is readable by other systems, for instance, a test stand and/or maintenance system, or written to non-volatile memory of the FADEC or other system. If a pass status is observed on the next engine start sequence, the FADEC may continue with normal engine starting operation; otherwise, the FADEC may attempt to use alternate techniques to mitigate a bowed rotor condition, such as dry motoring. Dry motoring can also be used if the engine is started before the CTM is shutdown. For instance, if it is determined that the CTM has not been run for a sufficient period of time to prevent a bowed rotor condition, dry motoring can be used. In some embodiments, if the CTM is restarted and runs for a predetermined period of time, then dry motoring can be canceled/inhibited during engine starting. The FADEC can shut down the CTM based on elapsed motoring time and/or a measured temperature.

During a dry motoring process, a starter valve can be actively adjusted to deliver air pressure from an air supply to an engine starting system that controls starting rotor speed. Dry motoring may be performed by running an engine starting system at a lower speed with a longer duration than typically used for engine starting while dynamically adjusting the starter valve to maintain the rotor speed and/or follow a dry motoring profile. Dry motoring is typically performed at a higher speed than bowed rotor prevention performed by the CTM. Some embodiments increase the rotor speed of the starting spool to approach a critical rotor speed gradually and as thermal distortion is decreased the starting spool then accelerates beyond the critical rotor speed to complete the engine starting process.

The critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor, especially in the high pressure compressor if the rotor is straddle-mounted.

A bowed rotor prevention system including the CTM can also include a back-drive preventer (e.g., an overrunning clutch) to isolate the CTM from other sources of driving rotation of the gas turbine engine. The CTM can drive rotation of the gas turbine engine through an accessory gearbox or other gear train as part of a transmission system. As one example, the CTM is on a starter of the gas turbine engine and drives a starter gear set through a tower shaft to slowly rotate a starting spool of the gas turbine engine. The CTM may be capable of continuous stall torque as well as continuous free running in the case of CTM shaft shear and/or other failure modes. If core rotation fails or fault condition is detected (e.g., insufficient power), a bowed rotor prevention pass/fail status can be set to indicate the failure. Alternatively or additionally, the status can be sent to one or more systems, such as an aircraft maintenance computer system.

The CTM can rotate turbomachinery of the gas turbine engine at low speeds (e.g. less than 5000 RPM) or at very low speed (e.g., <5 revolutions per minute (RPM)) in order to equalize the thermal gradient of the rotating parts after engine shutdown. The core turning motor can interface through any of the gear-driven accessories of the engine, such as an air turbine starter or a crank pad location. The power requirements of the core turning motor are substantially reduced in that the rotation needed to equalize the thermal gradients may be on the order of less than 3 RPM. Upon engine shutdown, the core turning motor can be controlled to rotate the turbomachinery, e.g., a high pressure spool of the gas turbine engine, for a predetermined period of time (30-40 minutes, for example) or as a function of one or more parametric values such as a measured temperature. By slow and/or periodic rotation of the turbomachinery, the thermal gradient is avoided, and thus a bow condition is prevented/eliminated.

Embodiments avoid high speed rotation (e.g., 5000-7000 RPM) of the engine after shutdown and also avoid requiring a flight crew to monitor the temperature of each engine of a multi-engine aircraft for several minutes prior to restarting each engine. Rather than using a ground cart or other external source to drive engine rotation (e.g., an external pneumatic system) or an auxiliary power unit of the aircraft that is typically used to rotate turbomachinery of the engine at a starting speed, embodiments use an electric motor as the core turning motor operable to slowly rotate (e.g., <5 RPM) the turbomachinery after engine shutdown. Embodiments of the core turning motor can be dedicated for use in bowed rotor prevention, and as such, sized with a lower weight and volume than would be needed to drive rotation of the engine at or above an engine starting speed. Gear reductions can be used to reduce electric power consumption.

Various embodiments of this disclosure may be applied on any turbomachinery component that requires cooling after shutdown. For example, gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Smaller-scale engines such as auxiliary power units typically utilize a one-spool design, with co-rotating compressor and turbine sections. Larger-scale jet engines and industrial gas turbines are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft, including supersonic jet fighters. Unducted (open rotor) turbofans and ducted propeller engines are also known, in a variety of counter-rotating and aft-mounted configurations.

Referring now to FIG. 1, a cross-sectional view of a gas turbine engine 10, in a turbofan configuration is illustrated. The illustrated gas turbine engine 10 includes a propulsion fan 12 mounted inside a bypass duct 14 upstream of a fan exit guide vane 13. A power core of the engine is formed by a compressor section 16, a combustor 18 and a turbine section 20. Rotor blades (or airfoils) 21 in the compressor section 16 and/or the turbine section 20 may be subject to deflection or bowing if a thermal gradient forms after engine shutdown.

In the two-spool, high bypass configuration of FIG. 1, compressor section 16 includes a low pressure compressor 22 and a high pressure compressor 24. The turbine section 20 includes high a pressure turbine 26 and a low pressure turbine 28.

The low pressure compressor 22 is rotationally coupled to the low pressure turbine 28 via a low pressure shaft 30, thereby forming the low pressure spool or low spool 31. High pressure compressor 24 is rotationally coupled to the high pressure turbine 26 via a high pressure shaft 32, forming the high pressure spool or high spool 33 (also referred to as a starting spool).

During operation of the gas turbine engine 10, the fan 12 accelerates air flow from an inlet 34 through bypass duct 14, generating thrust. The core airflow is compressed in the low pressure compressor 22 and the high pressure compressor 24 and then the compressed airflow is mixed with fuel in the combustor 18 and ignited to generate combustion gas.

The combustion gas expands to drive the high and low pressure turbines 26 and 28, which are rotationally coupled to high pressure compressor 24 and low pressure compressor 22, respectively. Expanded combustion gases exit through exhaust nozzle 36, which is shaped to generate additional thrust from the exhaust gas flow.

In advanced turbofan designs, the low pressure shaft 30 may be coupled to fan 12 via geared drive mechanism 37, providing improved fan speed control for increased efficiency and reduced engine noise. Propulsion fan 12 may also function as a first-stage compressor for gas turbine engine 10, with low pressure compressor 22 performing as an intermediate-stage compressor or booster. Alternatively, the low pressure compressor stages are absent, and air from fan 12 is provided directly to high pressure compressor 24, or to an independently rotating intermediate compressor spool.

The gas turbine engine 10 may have a range of different shaft and spool geometries, including one-spool, two-spool and three-spool configurations, in both co-rotating and counter-rotating designs. Gas turbine engine 10 may also be configured as a low bypass turbofan, an open-rotor turbofan, a ducted or un-ducted propeller engine, or an industrial gas turbine.

A number of stations for temperature measurement/computation are defined with respect to the gas turbine engine 10 according to conventional nomenclature. Station 2 is at an inlet of low pressure compressor 22 having a temperature T2. Station 3 is at an inlet of the combustor 18 having a temperature T3. Station 4 is at an exit of the combustor 18 having a temperature T4. Station 5 is at an exit of the low pressure turbine 28 having a temperature T5. Temperatures in embodiments may be measured and/or modeled at one or more stations 2-5 and/or at other locations. Measured and/or modeled temperatures can be normalized to account for hot day/cold day differences. For instance, measured temperature T2 can be used as an ambient temperature and a modeled or measured temperature (e.g., T3) can be normalized by subtracting measured temperature T2.

In embodiments, an engine accessory gearbox 40 is mechanically coupled to a rotating portion of the gas turbine engine 10, such as the high pressure spool 33 (e.g., an engine core component). Rotation of various engine accessories can be driven through the engine accessory gearbox 40, such as pumps and electric generators. In embodiments, a core turning motor 44 is coupled through the engine accessory gearbox 40 as part of a bowed rotor prevention system 42 and may be integrally formed with an engine accessory, such as a starter. The bowed rotor prevention system 42 also includes FADEC 102 to drive the CTM 44 to prevent a bowed rotor condition of the gas turbine engine 10 based on aircraft power from aircraft power source 60. When using aircraft power source 60, the FADEC 102 can operate in a low-power bowed rotor prevention mode rather than a full-power mode used to control operation of the gas turbine engine 10. In full-power mode, the FADEC 102 can receive power from other sources, such as one or more generators (e.g., generator 170 of FIG. 4). A switch 56 is interposed between the FADEC 102 and the aircraft power source 60. Switched power can be provided on a power bus 48 to the FADEC 102, where the FADEC 102 may regulate and/or condition power provided on power bus 50 to the CTM 44. The FADEC 102 can provide commands and retrieve status from the CTM 44 via motor interface 52. A pass/fail status can be output from the FADEC 102 on a communication interface 54 to indicate whether the FADEC 102 was able to successfully complete a bowed rotor prevention process using the CTM 44. Alternatively, the pass/fail status can be retained in non-volatile memory of the FADEC 102 for later use/reporting, e.g., during full-power mode. The FADEC 102 can set a maintenance flag upon detecting that the CTM 44 did not turn when commanded. If the FADEC 102 determines that the CTM 44 did not turn or the FADEC 102 was otherwise unsuccessful at completing bowed rotor prevention using the CTM 44, the FADEC 102 can perform a dry motoring process to mitigate potential bowed rotor conditions.

In an embodiment, the core turning motor 44 drives rotation the gas turbine engine 10 at less than 10 RPM. The FADEC 102 is operable to control a flow of electric current from the aircraft power source 60 to the core turning motor 44. The FADEC 102 is operable to engage the core turning motor 44 based on an engine shutdown condition of the gas turbine engine 10 of FIG. 1. For example, the FADEC 102 may detect an engine shutdown condition of the gas turbine engine 10 of FIG. 1 and enable low-power bowed rotor prevention mode prior to fully depowering of the FADEC 102. Alternatively, the low-power bowed rotor prevention mode of the FADEC 102 can be enabled by another source, such as a sensor, an aircraft communication bus, a discrete switch, or the like. The FADEC 102 may also monitor the aircraft power source 60 and/or back electromotive force of the core turning motor 44 as part of a monitoring process to confirm proper system operation and capability.

The FADEC 102 may include memory to store instructions that are executed by one or more processors. The executable instructions may be stored or organized in any manner and at any level of abstraction, such as in connection with a controlling and/or monitoring operation of one or more systems of the gas turbine engine 10 of FIG. 1. The processors can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored data and control algorithms in a non-transitory form. The FADEC 102 can include multiple processing systems as separate channels, where only a single channel of the FADEC may be used in the low-power bowed rotor prevention mode.

Figure 2:
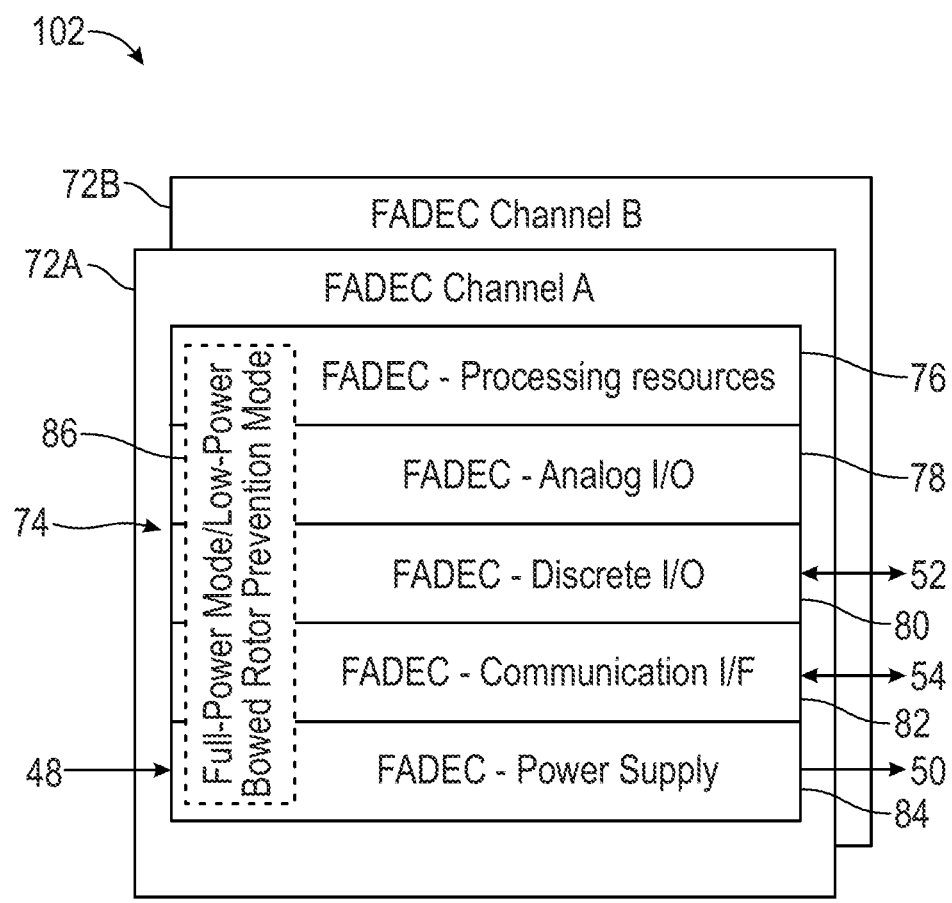
FIG. 2 is a block diagram of a control system according to an embodiment of the disclosure.

In an embodiment as depicted in FIG. 2, a FADEC 102 includes channel A 72A and channel B 72B, where each of the channels 72A, 72B includes a plurality of FADEC resources 74 such as FADEC processing resources 76, FADEC analog I/O 78, FADEC discrete I/O 80, FADEC communications interface 82, FADEC power supply 84, and/or other resources (not depicted). When the FADEC 102 receives power on power bus 50 during a bowed rotor prevention process, a power mode 86 of the FADEC resources 74 can be switched from a full-power mode to a low-power bowed rotor prevention mode. In full-power mode, both channels 72A, 72B can be operational in an active or standby mode. In low-power bowed rotor prevention mode, only one of the channels 72A, 72B may be powered. For instance, if channel A 72A was active and in control at engine shutdown, channel B 72B may switch from a standby operational mode to a depowered mode. Further, the low-power bowed rotor prevention mode can depower or reduce power to selected components of the channel 72A, 72B that remains powered. For example, portions of the FADEC processing resources 76, FADEC analog I/O 78, FADEC discrete I/O 80, FADEC communications interface 82, FADEC power supply 84, and/or other resources can be depowered or operate in a low-power state in channel A 72A, while channel B 72B is fully depowered. Power reduction can be achieved by depowering processing subsystems, output drivers, communication subsystems, and power subsystems that are not used during operation of the CTM 44 of FIG. 1.

Figure 3:
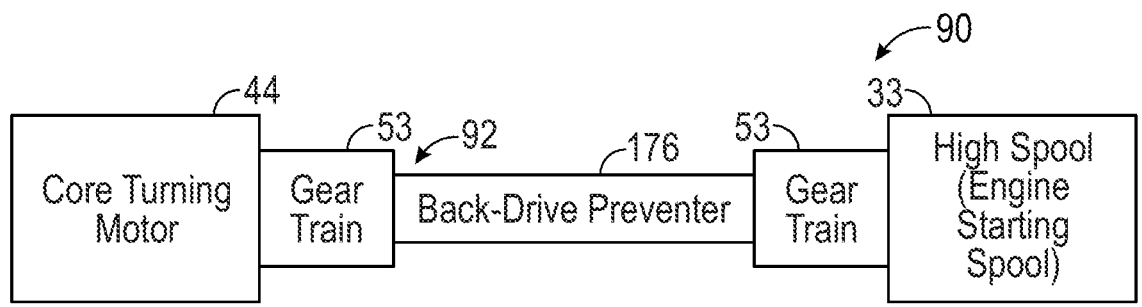
FIG. 3 is a block diagram of a core turning motor system according to an embodiment of the disclosure.

FIG. 3 depicts a core turning motor system 90 as including the CTM 44, a transmission system 92, and the high spool (engine starting spool) 33. The transmission system 92 can include a gear train 53 and a back-drive preventer 176 (e.g., a one-way clutch). The gear train 53 can be distributed through a number of shafts (e.g., a tower shaft), gear sets, gear boxes (e.g., an accessory gear box), and/or other transmission components.

Figure 4:
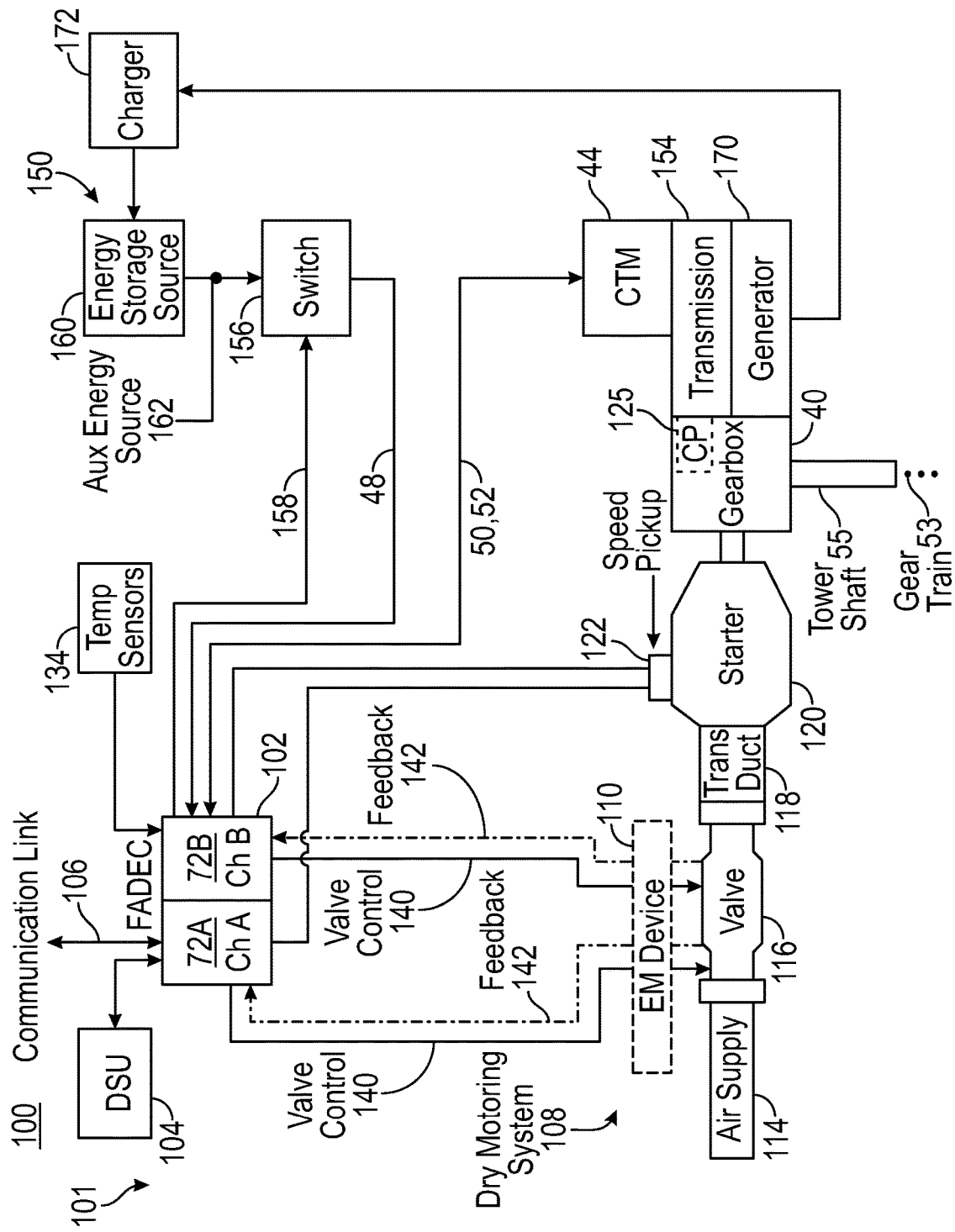
FIG. 4 is a block diagram of a bowed rotor prevention system according to an embodiment of the disclosure.

Turning now to FIG. 4, a schematic of a starting system 100 for the gas turbine engine 10 of FIG. 1 is depicted according to an embodiment. The starting system 100 is also referred to generally as a gas turbine engine system. In the example of FIG. 4, the starting system 100 includes FADEC 102 with channel A 72A and channel B 72B. The starting system 100 can also include a data storage unit (DSU) 104 that retains data between shutdowns of the gas turbine engine 10 of FIG. 1. The DSU 104 includes non-volatile memory and retains data between cycling of power to the FADEC 102 and DSU 104. A communication link 106 can include an aircraft and/or test stand communication bus to interface with aircraft controls, e.g., a cockpit, various onboard computer systems, and/or a test stand.

A dry motoring system 108 is operable to drive rotation of a starting spool (e.g., high spool 33) of the gas turbine engine 10 of FIG. 1. Either or both channels 72A, 72B of FADEC 102 can alternate on and off commands to an electromechanical device 110 which may be coupled to a starter valve 116 to achieve a partially open position of the starter valve 116 to control a flow from a starter air supply 114 (also referred to as air supply 114) through a transfer duct 118 to an air turbine starter 120 (also referred to as starter 120 or pneumatic starter motor 120) to drive rotation of a starting spool of the gas turbine engine 10 below an engine idle speed. The air supply 114 (also referred to as starter air supply 114) can be provided by any known source of compressed air, such as an auxiliary power unit or ground cart.

The FADEC 102 can monitor a speed sensor, such as speed pickup 122 that may sense the speed of the engine rotor through its connection to gearbox 40 which is in turn connected to the high spool 33 via tower shaft 55 through gear train 53 (e.g., rotational speed of high spool 33) or any other such sensor for detecting or determining the speed of the gas turbine engine 10 of FIG. 1. The starter 120 may be coupled to the gearbox 40 of the gas turbine engine 10 of FIG. 1 directly or through a transmission such as a clutch system. The FADEC 102 can establish a control loop with respect to rotor speed to adjust positioning of the starter valve 116.

The starter valve 116 may be designed as an on/off valve which is typically commanded to either fully opened or fully closed. However, there is a time lag to achieve the fully open position and the fully closed position. By selectively alternating an on-command time with an off-command time through the electromechanical device 110, intermediate positioning states (i.e., partially opened/closed) can be achieved. The FADEC 102 can modulate the on and off commands (e.g., as a duty cycle using pulse width modulation) to the electromechanical device 110 to further open the starter valve 116 and increase a rotational speed of the starting spool of the gas turbine engine 10 of FIG. 1. In an embodiment, the electromechanical device 110 has a cycle time defined between an off-command to an on-command to the off-command that is at most half of a movement time for the starter valve 116 to transition from fully closed to fully open. Pneumatic lines or a mechanical linkage (e.g., via valve control 140) can be used to drive the starter valve 116 between the open position and the closed position. The electromechanical device 110 can be a solenoid that positions the starter valve 116 based on intermittently supplied electric power as commanded by the FADEC 102. In an alternate embodiment, the electromechanical device 110 is an electric valve controlling muscle air to adjust the position of the starter valve 116 as commanded by the FADEC 102.

Rather than using an electromechanical device 110 coupled to the starter valve 116 to achieve a partially open position of the starter valve 116, the dry motoring system 108 can use a variable position starter valve as the starter valve 116. Either or both channels of FADEC 102 can output a valve control signal 140 operable to dynamically adjust a valve angle of the starter valve 116 that selectively allows a portion of the air supply 114 to pass through the starter valve 116 and transfer duct 118 to air turbine starter 120. The starter valve 116 can be a continuous/infinitely adjustable valve that can hold a commanded valve angle, which may be expressed in terms of a percentage open/closed and/or an angular value (e.g., degrees or radians). Performance parameters of the starter valve 116 can be selected to meet dynamic response requirements of the starting system 100. For example, in some embodiments, the starter valve 116 has a response rate of 0% to 100% open in less than 40 seconds. In other embodiments, the starter valve 116 has a response rate of 0% to 100% open in less than 30 seconds. In further embodiments, the starter valve 116 has a response rate of 0% to 100% open in less than 20 seconds.

In some embodiments, the FADEC 102 can monitor a valve angle of the starter valve 116 using valve angle feedback signals 142 provided to both channels 72A, 72B of FADEC 102. As one example, in an active/standby configuration, both channels 72A, 72B of the FADEC 102 can use the valve angle feedback signals 142 to track a current valve angle, while only one channel 72A or 72B designated as an active channel outputs valve control signal 140. Upon a failure of the active channel, the standby channel of FADEC 102 can take over as the active channel to output valve control signal 140. In an alternate embodiment, both channels 72A, 72B of FADEC 102 output all or a portion of a valve angle command simultaneously on the valve control signals 140. The FADEC 102 can establish an outer control loop with respect to rotor speed and an inner control loop with respect to the valve angle of the starter valve 116.

When needed, dry motoring can be performed according to one or more processes as described in U.S. patent application Ser. No. 15/042,794, which is incorporated by reference herein in its entirety.

One or more temperature sensors 134, such as thermocouples, can provide measured temperatures at associated locations of the gas turbine engine 10 to the FADEC 102. For example, the temperature sensors 134 can be located at station 2 (T2), station 3 (T3), station 4 (T4), station 5 (T5) and/or other locations as previously described with respect to FIG. 1.

The starting system 100 also includes a core-turning motoring system 150 (also referred to as an auxiliary drive system) that includes CTM 44 that is operable to drive rotation of the starting spool (e.g., high spool 33) of the gas turbine engine 10 of FIG. 1 through gearbox 40. A transmission 154 (which can be part of transmission system 92 of FIG. 3) may be interposed between the CTM 44 and the gearbox 40 for reduction gearing and/or a clutch (e.g., inclusion of the back-drive preventer 176 of FIG. 3). The transmission 154 can interface with the gearbox 40 at a manual crank pad 125 location. In alternate embodiments, the transmission 154 interfaces with an alternate portion of the gearbox 40, and/or the transmission 154 is integrally formed with the gearbox 40. The core-turning motoring system 150 also includes a switch 156 that may be commanded by either or both channels 72A, 72B of the FADEC 102 (e.g., using enable 158) to provide electrical power for the CTM 44 in a low-power bowed rotor prevention mode. According to various embodiments, the switch 156 may be a mechanical switch, electrical relay, or other mechanism for controlling the distribution of electrical power to the core-turning motoring system 150. The switch 156 may be an embodiment of switch 56 of FIG. 1 or an additional switch. Electrical power may be provided from an energy storage source 160 and/or an auxiliary energy source 162, such as ground power or other aircraft/external source, as embodiments of the aircraft power source 60 of FIG. 1. The energy storage source 160 can be a battery or capacitor of an aircraft electrical system, which may be charged by a generator 170 through a charger 172. The generator 170 may be driven by the gearbox 40 (e.g., during operation of the gas turbine engine 10) or other source of rotational energy on the aircraft. Examples of the generator 170 include a permanent magnet alternator/generator, an integrated drive generator, a variable frequency generator, and other generator technologies known in the art.

In various embodiments, the core-turning motoring system 150 or the dry motoring system 108 can be used to prevent/mitigate a bowed rotor condition depending on the present operating characteristics of the gas turbine engine 10 of FIG. 1. The FADEC 102 in combination with the dry motoring system 108 and the core-turning motoring system 150 may be collectively referred to as a bowed rotor prevention system 101 that is operable to prevent and/or mitigate a bowed rotor condition of the gas turbine engine 10 of FIG. 1. In an embodiment, the FADEC 102 is operable to engage the CTM 44 and drive rotation of the engine core of the gas turbine engine 10 of FIG. 1. Once in the low-power bowed rotor prevention mode, the FADEC 102 may drive rotation of the CTM 44 until a time or temperature threshold is met or a shutoff request is detected based on one or more of: a detected opening of a nacelle of the gas turbine engine 10, a shutoff switch accessible to maintenance personnel on the nacelle or the gas turbine engine 10, a computer interface command on the aircraft, a detected fault condition, a time limit, a temperature limit, or a start command of the gas turbine engine 10 of FIG. 1. Rotation can be continuous or periodic based on time and/or sensed position.

Figure 5:
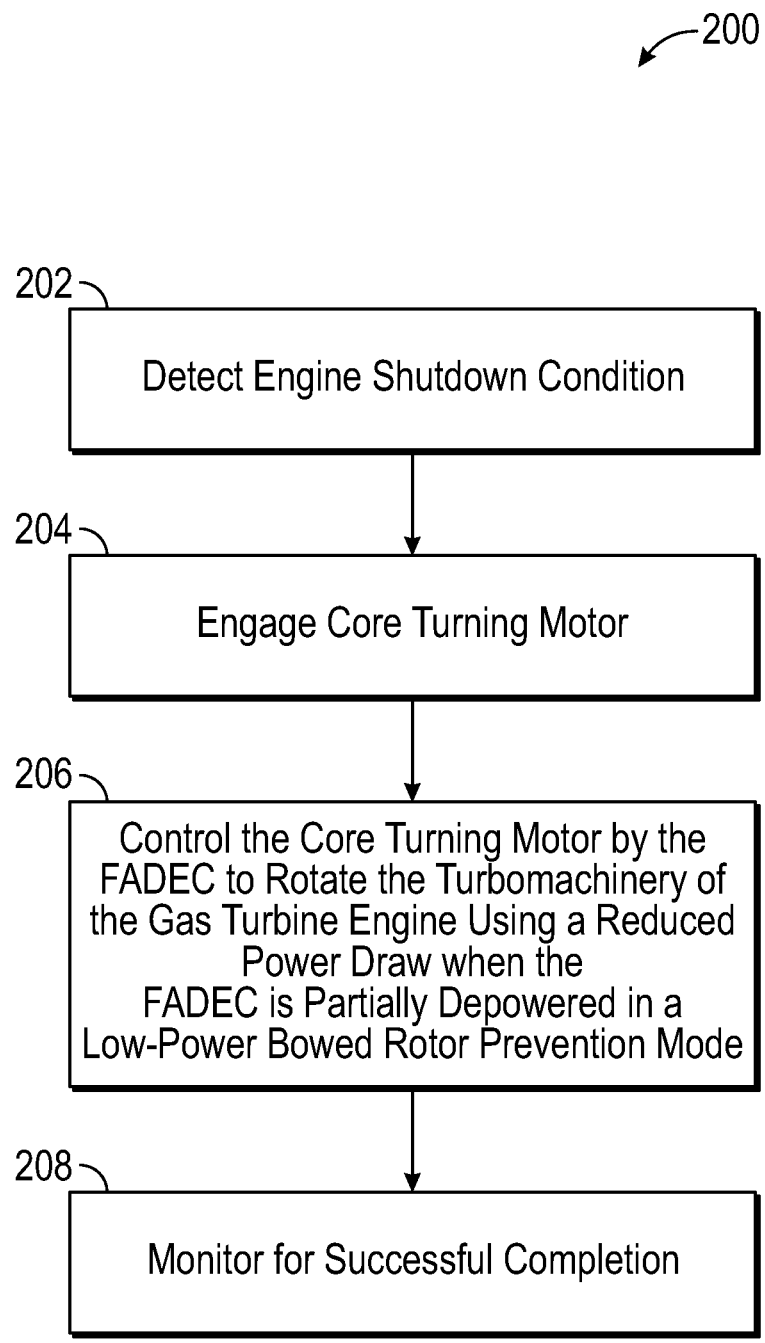
FIG. 5 is a process flow of a method according to embodiments of the disclosure.

FIG. 5 is a process flow of a method 200 according to an embodiment. The method 200 can be implemented by the bowed rotor prevention system 42 of FIG. 1 and/or bowed rotor prevention system 101 of FIG. 4, and thus FIG. 5 is described with reference to FIGS. 1-5. At block 202, an engine shutdown condition of the gas turbine engine 10 is detected, for instance, by the FADEC 102 while controlling operation of the gas turbine engine 10 in a full-power mode. After a confirmation period of time elapses, the FADEC 102 can initiate bowed rotor prevention and transition from full-power mode to low-power bowed rotor prevention mode. At block 204, the FADEC 102 engages the core turning motor 44 with turbomachinery of the gas turbine engine 10, for instance, through the engine accessory gearbox 40 by enabling a flow of electric current on the power bus 50 as provided by the aircraft power source 60. At block 206, the FADEC 102 controls the core turning motor 44 to rotate the turbomachinery of the gas turbine engine 10 using a reduced power draw from aircraft power when the FADEC 102 is partially depowered in the low-power bowed rotor prevention mode. The core turning motor 44 rotates turbomachinery of the gas turbine engine 10 at a low speed (e.g., <5 RPM) until a bowed rotor prevention threshold condition is met (e.g., a targeted time and/or temperature condition is met). Rotation may be substantially constant at about 0.1 RPM. Alternatively, the FADEC 102 can control the core turning motor 44 to drive rotation of the engine core for a partial rotation based on a timed duration or a sensed position, for instance, by periodically performing a half revolution of the engine core. At block 208, the FADEC 102 monitors for successful completion of the bowed rotor prevention process and makes the results available to one or more systems, e.g., an aircraft maintenance computer. If needed, the FADEC 102 can perform a dry motoring process on start-up when the FADEC 102 determines that the bowed rotor prevention process was not successful.

The FADEC 102 can determine a bowed rotor risk parameter based on engine thermal history and/or a temperature measurement, such as T3. The FADEC 102 can use the bowed rotor risk parameter to determine whether to enable the core turning motor 44 and one or more shutdown limits of the core turning motor 44, such as a time limit or temperature limit. For instance, the FADEC 102 can depower itself and the core turning motor 44 based on expiration of the time limit or as a function of a measured temperature, such as T3. Further, the core turning motor 44 can be shut down based on one or more of: a detected opening of a nacelle of the gas turbine engine 10, a shutoff switch accessible to maintenance personnel on the nacelle or the gas turbine engine 10, a computer interface command on the aircraft, a detected fault condition, a time limit, a temperature limit, or a start command of the gas turbine engine 10.

Figure 6:
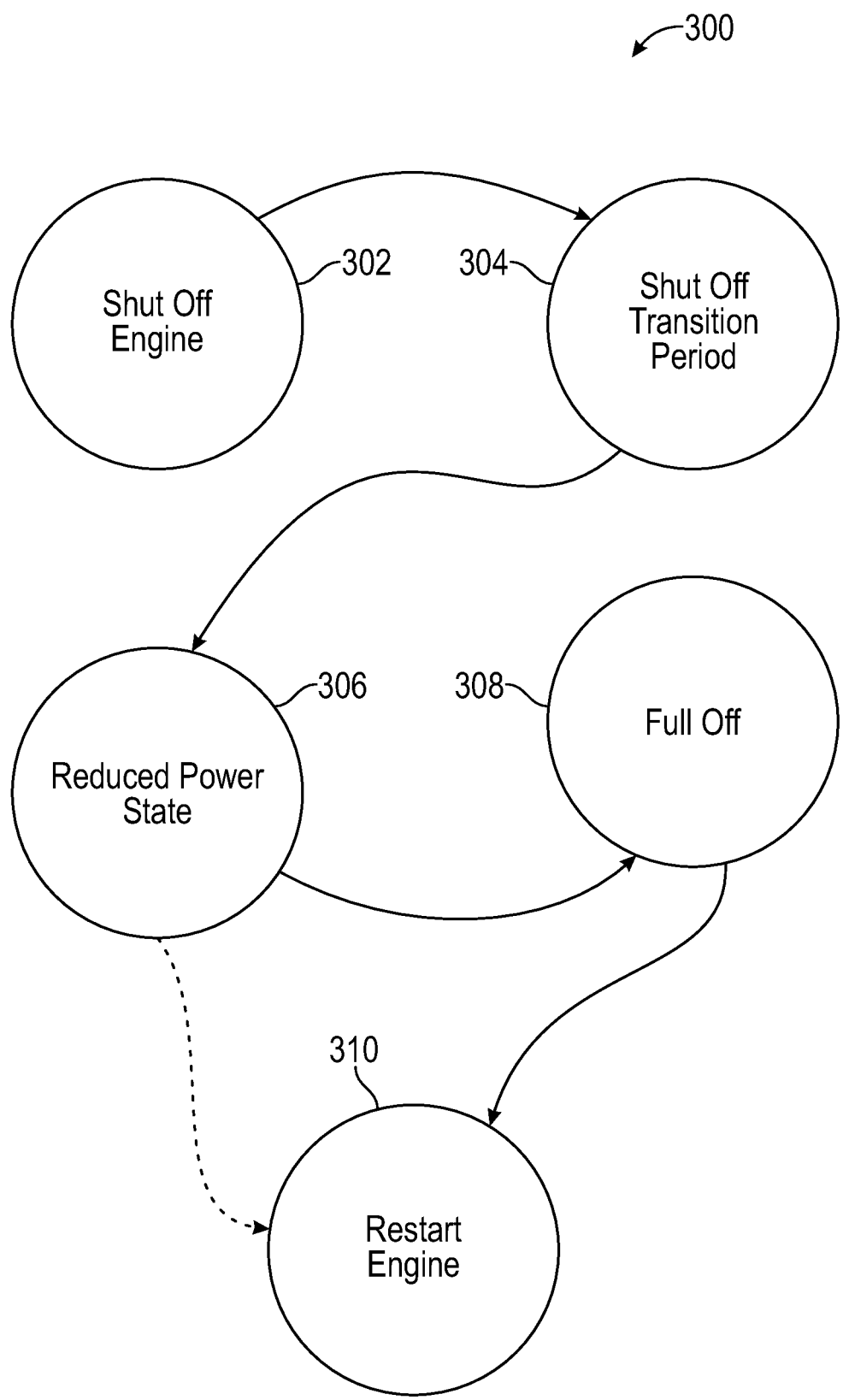
FIG. 6 is a state transition diagram according to embodiments of the disclosure.

FIG. 6 is a state transition diagram 300 further illustrating the transitions from engine shutoff to restart as described with respect to FIGS. 1-4. At state 302, the FADEC 102 detects an engine shutdown condition of gas turbine engine 10 while the FADEC 102 is operating in full-power mode. The FADEC 102 transitions to state 304 and performs various system checks during a shutdown transition period. For example, if channel A 72A is in control, channel A 72A may verify that connections and system components associated with operating the CTM 44 are functional. If there is an issue detected that would prevent channel A 72A from controlling CTM 44, channel B 72B (e.g., presently in standby mode) may take control if channel B 72B is able to control the CTM 44. During state 304, the FADEC 102 may continue to operate in full-power mode until shutdown tasks, such as message reporting, data recording, and the like, have completed. When the shutdown transition period completes, the FADEC 102 can transition from state 304 to state 306 for reduced power operation in a low-power bowed rotor prevention mode. In state 306, channel 72A or 72B can be depowered, and the opposite channel 72B or 72A can remain powered as a controller of CTM 44. A subset of FADEC processing resources 74 such as solenoid drives and/or a protection processor can be depowered or operated in a low-power state to reduce power draw by the FADEC 102. In state 306, the FADEC 102 controls the CTM 44 to continuously or periodically rotate the engine core of the gas turbine engine 10 until a shutdown condition is met or an engine restart request is received. If a shutdown condition is met (e.g., bowed rotor risk is sufficiently reduced), the FADEC 102 can transition to state 308 and depower itself and the CTM 44. When an engine restart is requested, the FADEC 102 transitions to state 310 and determines whether dry motoring is needed before completing the starting process of the gas turbine engine 10.

Technical effects and benefits include using a core turning motor to slowly rotate turbomachinery of a gas turbine engine after shutdown to equalize a thermal gradient of rotating parts that were heated during operation. Using a reduced power operating mode of a multi-channel FADEC and a lower power electric motor with gear reduction provides reduced power consumption during bowed rotor prevention processes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A bowed rotor prevention system for a gas turbine engine, the bowed rotor prevention system comprising:
a core turning motor operable to drive rotation of an engine core of the gas turbine engine; and
a full authority digital engine control (FADEC) comprising at least two channels, each of the at least two channels comprising a separate processing system, the FADEC configured to control operation of the gas turbine engine in a full-power mode and configured to control operation of the core turning motor to drive rotation of the engine core using a reduced power draw when the FADEC is partially depowered in a low-power bowed rotor prevention mode that depowers one of the at least two channels, wherein a first channel of the FADEC transitions from an active mode in the full-power mode to a low-power state in the low-power bowed rotor prevention mode comprising depowering of one or more portions of the first channel that include processing subsystems, output drivers, communication subsystems, and power subsystems of the first channel, and a second channel of the FADEC transitions from a standby mode in the full-power mode to fully depowered in the low-power bowed rotor prevention mode.

2. The bowed rotor prevention system as in claim 1, further comprising a switch interposed between the FADEC and an aircraft power source, wherein the core turning motor is an electric motor and the FADEC is operable to control a flow of electric current between the aircraft power source and the core turning motor based on a state of the switch.

3. The bowed rotor prevention system as in claim 1, wherein the FADEC is operable to transition from the full-power mode to the low-power bowed rotor prevention mode based on detecting an engine shutdown condition of the gas turbine engine.

4. The bowed rotor prevention system as in claim 1, wherein the FADEC delays enabling of the core turning motor after detecting an engine shutdown condition.

5. The bowed rotor prevention system as in claim 1, wherein the core turning motor is mechanically linked through a transmission system to the engine core.

6. The bowed rotor prevention system as in claim 5, wherein a gear reduction through the transmission system and the core turning motor is greater than 100:1.

7. The bowed rotor prevention system as in claim 1, wherein the engine core is a high spool of the gas turbine engine.

8. The bowed rotor prevention system as in claim 1, wherein the FADEC depowers itself and the core turning motor based on expiration of a time limit or as a function of a measured temperature.

9. The bowed rotor prevention system as in claim 1, wherein the FADEC is operable to monitor an operational status of the core turning motor and determine a success status of bowed rotor prevention.

10. The bowed rotor prevention system as in claim 1, wherein the FADEC is operable to control the core turning motor to drive rotation of the engine core at a substantially constant speed for a timed duration.

11. The bowed rotor prevention system as in claim 1, wherein the FADEC is operable to control the core turning motor to drive rotation of the engine core for a partial rotation based on a timed duration or a sensed position.

12. The bowed rotor prevention system as in claim 11, wherein the partial rotation comprises a half revolution of the engine core performed periodically.

13. The bowed rotor prevention system as in claim 1, wherein the FADEC determines a bowed rotor risk parameter based on engine thermal history and/or a temperature measurement.

14. The bowed rotor prevention system as in claim 13, wherein the FADEC uses the bowed rotor risk parameter to determine whether to enable the core turning motor and one or more shutdown limits of the core turning motor.

15. The bowed rotor prevention system as in claim 1, wherein the FADEC and the core turning motor consume less than 500 watts while driving rotation of the engine core in the low-power bowed rotor prevention mode.

16. The bowed rotor prevention system as in claim 1, wherein the FADEC and the core turning motor consume 40 watts while driving rotation of the engine core in the low-power bowed rotor prevention mode.

17. The bowed rotor prevention system as in claim 1, wherein the FADEC is operable to perform a dry motoring process based on determining that a bowed rotor prevention process was not successfully completed.

18. The bowed rotor prevention system as in claim 1, wherein the core turning motor is shut down based on one or more of: a detected opening of a nacelle of the gas turbine engine, a shutoff switch accessible to maintenance personnel on the nacelle or the gas turbine engine, a computer interface command on an aircraft, a detected fault condition, a time limit, a temperature limit, or a start command of the gas turbine engine.

19. A method of bowed rotor prevention for a gas turbine engine, the method comprising:
engaging a core turning motor with turbomachinery of the gas turbine engine; and
controlling the core turning motor by a full authority digital engine control (FADEC) comprising at least two channels, each of the at least two channels comprising a separate processing system, the FADEC configured to rotate the turbomachinery of the gas turbine engine using a reduced power draw when the FADEC is partially depowered in a low-power bowed rotor prevention mode that depowers one of the at least two channels, wherein the FADEC controls operation of the gas turbine engine in a full-power mode, and further wherein a first channel of the FADEC transitions from an active mode in the full-power mode to a low-power state in the low-power bowed rotor prevention mode comprising depowering of one or more portions of the first channel that include processing subsystems, output drivers, communication subsystems, and power subsystems of the first channel, and a second channel of the FADEC transitions from a standby mode in the full-power mode to fully depowered in the low-power bowed rotor prevention mode.

20. The method as in claim 19, wherein the FADEC is operable to monitor an operational status of the core turning motor and determine a success status of bowed rotor prevention.

* * * * *